United States Patent [19]

Wick et al.

[11] 4,128,396
[45] Dec. 5, 1978

[54] PROCESS FOR THE IMPROVEMENT OF DYEING PROPERTIES OF PIGMENTS OF THE ANILINO AND ARYLMERCAPTO ANTHRAQUINONE SERIES

[75] Inventors: Arnold Wick, Therwil; Max Jost, Oberwill, both of Switzerland

[73] Assignee: Ciba-Geigy Corporation, Ardsley, N.Y.

[21] Appl. No.: 837,497

[22] Filed: Sep. 28, 1977

Related U.S. Application Data

[63] Continuation of Ser. No. 698,624, Jun. 21, 1976, abandoned, which is a continuation-in-part of Ser. No. 509,877, Sep. 27, 1974, Pat. No. 3,975,410.

[30] Foreign Application Priority Data

Oct. 10, 1973 [CH] Switzerland ............. 14393/73

[51] Int. Cl.² .................. C09B 1/00; C07C 49/68
[52] U.S. Cl. .................. 8/39 C; 260/376; 260/384
[58] Field of Search ............. 8/39 C; 260/384

[56] References Cited

U.S. PATENT DOCUMENTS

| 2,226,909 | 12/1940 | Peter | 260/374 |
| 3,507,606 | 4/1970 | Hildreth et al. | 8/39 C |
| 3,785,766 | 1/1974 | Botros | 8/39 C |
| 3,840,567 | 10/1974 | Genta | 8/39 C |
| 3,975,410 | 8/1976 | Wick et al. | 8/39 B |

*Primary Examiner*—A. Lionel Clingman
*Attorney, Agent, or Firm*—Michael W. Glynn; Vincent J. Cavalieri

[57] ABSTRACT

Process for the improvement of dyeing properties of pigments of the anilino and arylmercapto anthraquinone series for bulk dyeing linear polyesters by halogenation of unhalogenated or lower halogenated compounds of the formula

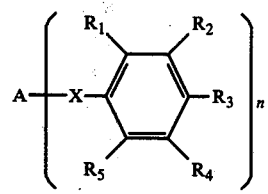

wherein A is an anthraquinoidal radical being free from nitro groups, X is —NH— or —S—, $n$ is a number of 1 to 4 and $R_1$ to $R_5$ are hydrogen, halogen, alkyl, alkoxy, aryloxy, arylcarbonyl or arylsulphonyl.

3 Claims, No Drawings

PROCESS FOR THE IMPROVEMENT OF DYEING PROPERTIES OF PIGMENTS OF THE ANILINO AND ARYLMERCAPTO ANTHRAQUINONE SERIES

This is a continuation of application Ser. No. 698,624, abandoned filed on June 21, 1976, which is a continuation-in-part of application Ser. No. 509,877, filed on Sept. 27, 1974, now U.S. Pat. No. 3,975,410.

It has been disclosed in numerous patent specifications that colouring substances of the anilino-anthraquinone or arylmercapto-anthraquinone series, of the formula

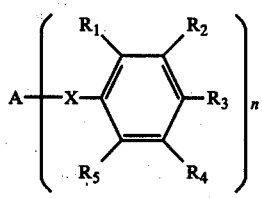

wherein A denotes a simple anthraquinoidal radical or an anthraquinoidal radical which is optionally further substituted or is more highly condensed, X denotes a —NH— or —S— group, n denotes an integer from 1 to 4, and $R_1$ to $R_5$ denote hydrogen and/or substituents of the most diverse kind, such as alkyl, aralkyl, aryl, alkoxy, aryloxy, arylamino, hydroxyalkoxy, alkylcarboxylate, arylketo, arylsulphonyl or nitro groups or halogen atoms, the groups

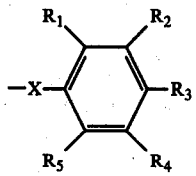

being preferably in α-positions of the anthraquinone radical, are suitable for the bulk dyeing of polymeric materials such as polystyrene, polymethacrylate, polyamide and particularly linear polyesters.

Particularly in the bulk dyeing of linear polyesters, the colouring substances mentioned frequently still exhibit various defects in regard to their properties of application and fastness, such as insufficient fastness to light, chlorite, dry cleaning or sublimation, but, in particular, frequently insufficient fastness to rubbing after the dyed material has been thermofixed. Also, they often dye only in dull shades of a weak colour.

It has now been found that the unhalogenated or lower halogenated compounds of the formula

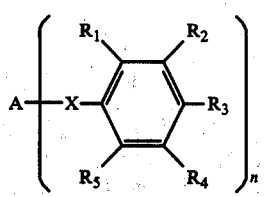

wherein A denotes an anthraquinoidal radical which is free from nitro groups, X denotes a —NH— or —S— bridge, n denotes a number for 1 to 4, $R_1$ to $R_5$ denote substituents of the group hydrogen, halogen, alkyl, alkoxy, aryloxy, arylcarbonyl or arylsulphonyl, and, if n=1, the group

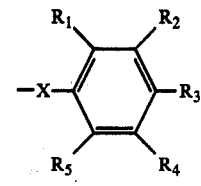

represents a radical containing at least two phenyl nuclei or A denotes a more highly condensed anthraquinoidal radical, show improved dyeing properties for bulk dyeing linear polyesters when they are halogenated.

After being halogenated the compounds to be used for pigmenting linear polyesters may correspond to the formula

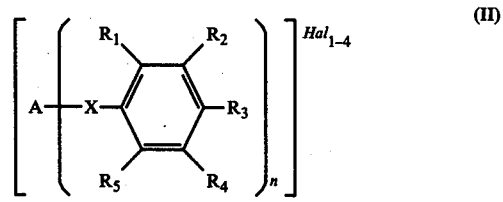

wherein A, X and n are as defined above, $Hal_{1-4}$ denotes 1 to 4 halogen atoms, preferably chlorine or bromine atoms, which correspond to 1 to 4 of the substituents $R_1$ to $R_5$.

$R_1$ to $R_5$ are preferably composed of substituents of the following group: hydrogen, chlorine, bromine, alkyl having 1 to 4 C atoms, alkoxy having 1 to 4 C atoms, phenoxy, diphenylyloxy, naphthyloxy, benzoyl, p-phenylbenzoyl, phenylsulphonyl or diphenylylsulphonyl.

The halogenation is carried out by methods which are generally known. Halogenating agents which can be used are elementary halogen, such as chlorine and, particularly, bromine, or compounds which can transmit active halogen, such as sulphuryl chloride or thionyl chloride.

The colouring substance to be halogenated is preferably suspended or dissolved for this purpose in a diluent such as water, sulphuric acid or particularly an organic solvent, for example chlorobenzene, o-dichlorobenzene, trichlorobenzene and particularly nitrobenzene, and is treated, in the temperature range of from −10° to 150° C., preferably 20°–60° C., with the halogenating agent, optionally in the presence of a halogenation catalyst such as iodine or an iron salt.

The following may be particularly mentioned as anilinoanthraquinone derivatives or phenylmercaptoanthraquinone derivatives to be halogenated:

α-Phenylaminoanthraquinones of the formula

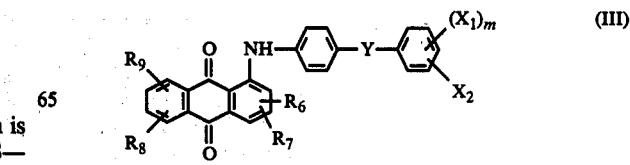

wherein Y denotes an O or S atom, or a —CO— or —SO$_2$— group, X$_1$ and X$_2$ denote hydrogen, alkyl, aryl, alkyloxy or aryloxy, and R$_6$–R$_9$ represent hydrogen, halogen, hydroxyl, amino, alkoxy, phenoxy, arylamino, arylmercapto or benzoylamino in the α- or β-position of the anthraquinone radical, and m represents the number 1 to 3.

Y preferably denotes a —CO— group, X$_1$ denotes hydrogen or a methyl or ethyl group, X$_2$ denotes hydrogen or a propyl, butyl, methoxy, ethoxy, phenyl, naphthyl or phenoxy group, R$_6$ and R$_7$ denote hydrogen, and R$_8$ and R$_9$ denote substituents in the 5- and 8-position, to be precise hydrogen, methoxy, phenoxy, phenylmercapto or benzoylamino groups, and m denotes the number 1 to 3.

The following examples of these may be mentioned: 1-(4'-diphenylylamino)-anthraquinone, 1-(4'-phenoxyanilino)anthraquinone, 1-(4'-phenylaminoanilino)-anthraquinone, 1-(4'-benzoylanilino)-anthraquinone, 1-(4'-benzylanilino)-anthraquinone, 1-(4',4''-phenylbenzoylanilino)-anthraquinone, 1-(4',4''-methylbenzoylanilino)-anthraquinone, 1-(4',4''-phenoxybenzoylanilino)-anthraquinone, 1-(4'-phenylsulphonylanilino)-anthraquinone, 1-(4',4''-diphenylsulphonylanilino)-anthraquinone, 1-(4'-diphenylylamino)-5,8-dihydroxyanthraquinone, 1-(4'-phenoxyanilino)-5,8-dihydroxyanthraquinone, 1-(4'-phenylaminoanilino)-5,8-dihydroxyanthraquinone, 1-(4'-benzoylanilino)-5,8-dihydroxyanthraquinone, 1-(4'-benzylanilino)-5,8-dihydroxyanthraquinone, 1-(4',4''-phenylbenzoylanilino)-5,8-dihydroxyanthraquinone, 1-(4', 4''-methylbenzoylanilino)-5,8-dihydroxyanthraquinone, 1-(4',4''-phenoxybenzoylanilino)-5,8-dihydroxyanthraquinone, 1-(4'-phenylsulphonylanilino)-5,8-dihydroxyanthraquinone, 1-(4',4''-diphenylylsulphonylanilino)-5,8-dihydroxyanthraquinone, 1-(4'-diphenylylamino)-4-anilinoanthraquinone, 1-(4'-phenoxyanilino)-4-anilinoanthraquinone, 1-(4'-phenylaminoanilino)-4-anilinoanthraquinone, 1-(4'-benzoylanilino)-4-anilinoanthraquinone, 1-(4'-benzylanilino)-4-anilinoanthraquinone, 1-(4',4''-phenylbenzoylanilino)-4-anilinoanthraquinone, 1-(4',4''-methylbenzoylanilino)-4-anilinoanthraquinone, 1-(4',4''-phenoxybenzoylanilino)-4-anilinoanthraquinone, 1-(4'-phenylsulphonylanilino)-4-anilinoanthraquinone, 1-(4',4''-diphenylsulphonylanilino)-4-anilinoanthraquinone, 1-(4'-diphenylylamino)-4,5- or 8-phenylmercaptoanthraquinone, 1-(4'-phenoxyanilino)4,5- or 8-phenylmercaptoanthraquinone, 1-(4'-benzoylanilino)-4,5- or 8-phenylmercaptoanthraquinone, 1-(4'-benzylanilino)-4,5- or 8-phenylmercaptoanthraquinone, 1-(4',4''-phenylbenzoylanilino)-4,5- or 8-phenylmercaptoanthraquinone, 1-(4',4''-methylbenzoylanilino)-4,5- or 8-phenylmercaptoanthraquinone, 1-(4',4''-phenoxybenzoylanilino)-4,5- or 8-phenylmercaptoanthraquinone, 1-(4'-phenylsulphonylanilino)4,5- or 8-phenylmercaptoanthraquinone, 1-(4',4''-diphenylylsulphonylanilino)-4,5- or 8-phenylmercaptoanthraquinone, 1-(4'-diphenylylamino)-4,5- or 8-benzoylaminoanthraquinone, 1-(4'-phenoxyanilino)-4,5- or 8-benzoylaminoanthraquinone, 1-(4'-phenylaminoanilino)-4,5- or 8-benzoylaminoanthraquinone, 1-(4'-benzoylanilino)-4,5- or 8-benzoylaminoanthraquinone, 1-(4'-benzylanilino)-4,5- or 8-benzoylaminoanthraquinone, 1-(4',4''-phenylbenzoylanilino)-4,5- or 8-benzoylaminoanthraquinone, 1-(4',4''-methylbenzoylanilino)-4,5- or 8-benzoylaminoanthraquinone, 1-(4',4''-phenoxybenzoylanilino)-4,5- or 8-benzoylaminoanthraquinone, 1-(4'-phenylsulphonylanilino)-4,5- or 8-benzoylaminoanthraquinone, 1-(4',4''-diphenylylsulphonylanilino)4,5- or 8-benzoylaminoanthraquinone, 1-(4'-diphenylylamino)-2-phenoxy-4-hydroxyanthraquinone, 1-(4'-phenoxyanilino)-2-phenoxy-4-hydroxyanthraquinone, 1-(4'-phenylaminoanilino)-2-phenoxy-4-hydroxyanthraquinone, 1-(4'-benzoylanilino)-2-phenoxy-4-hydroxyanthraquinone, 1-(4'-benzylanilino)-2-phenoxy-4-hydroxyanthraquinone, 1-(4'-phenoxyanilino)-4,5,8-trihydroxyanthraquinone, 1-(4'-phenylaminoanilino)-4,5,8-trihydroxyanthraquinone, 1-(4'-benzoylanilino)-4,5,8-trihydroxyanthraquinone and 1-(4'-benzylanilino)-4,5,8-trihydroxyanthraquinone.

Preferred anilino-anthraquinone derivatives or phenylmercapto-anthraquinone derivatives are also those of the formula I, wherein n = 1 and A denotes the radical of a more highly condensed anthraquinone derivative, such as 1,9-isothiazolanthrone, 1,9-pyrazolanthrone, 1,9-anthrapyrimidine, 1,9-anthrapyridone or a benzanthrone radical, of which the following examples are mentioned: 5- or 7-anilino-isothiazolanthrone, 5- or 7-(4'-methylanilino)-isothiazolanthrone, 5- or 7-(4'-phenoxyanilino)isothiazolanthrone, 5- or 7-anilinopyrazolanthrone, 6,8 or 11-anilino-anthrapyrimidine, 6,8 or 11-(4'-methylanilino)anthrapyrimidine, 6,8 or 11-(4'-chloroanilino)-anthrapyrimidine, 6,8 or 11-(4'-phenoxyanilino)-anthrapyrimidine, 6,8 or 11-anilino-2-phenyl-anthrapyrimidine, 6,8 or 11-(4'-methylanilino)-2-phenyl-anthrapyrimidine, 6,8 or 11-(4'-chloroanilino)-2-phenyl-anthrapyrimidine, 6,8 or 11-(4'-diphenylylamino)-2-phenyl-anthrapyrimidine, 6,8 or 11-(4'-phenoxyanilino)-2-phenyl-anthrapyrimidine, 6,8 or 11-(4'-phenylaminoanilino)-2-phenyl-anthrapyrimidine, 6,8 or 11-(4'-benzylanilino)-2-phenylanthrapyrimidine, 6,8 or 11-(4',4''-phenoxybenzoylanilino)-2-phenyl-anthrapyrimidine, 6,8 or 11-anilino-2-(4'-toluyl)-anthrapyrimidine, 6,8 or 11-(4'-methylanilino)-2-(4'-chlorophenyl)anthrapyrimidine, 6,8 or 11-(4'-benzylanilino)-2-(4'-chlorophenyl)-anthrapyrimidine, 6,8 or 11-anilino-2-(4'-diphenylyl)anthrapyrimidine, 6,8 or 11-(4'-methylanilino)-2-(4'-diphenylyl)anthrapyrimidine, 6,8 or 11-(4'-phenoxyanilino)-2-(4'-diphenylyl)anthrapyrimidine, 6,8 or 11-phenylmercapto-(4'-diphenylyl)anthrapyrimidine, 6,8 or 11-(4'-phenylaminoanilino)-2-(4'-diphenylyl)-anthrapyrimidine, 6,8 or 11-(4'-benzylanilino)-2-(4'-diphenylyl)-anthrapyrimidine, 3-methyl-6-anilino-anthrapyridine-2,7-dione, 3-methyl-6-(4'-phenoxyanilino)-anthrapyridine-2,7-dione, 3-methyl-6-(4'-methylanilino)-anthrapyridine-2,7-dione and 3-methyl-6-(4'-phenylaminoanilino)-anthrapyridine-2,7-dione; and also, in particular, anthraquinone derivatives of the formula I wherein n = 2, A denotes a mononuclear or more highly condensed anthraquinone radical, and both X's denote a —NH— or —S— bridge, or one X denotes a —NH— bridge and the other X denotes a —S— bridge, such as, for example: 1,4-, 1,5- or 1,8-di-anilinoanthraquinone, 1,4-, 1,5- or 1,8-di-(4'-methylanilino)-anthraquinone, 1,4-, 1,5- or 1,8-di-(2',3'-, 2',4'-, 2',5'-, 3',4'- or 3',5'-dimethylanilino)-antrhraquinone, 1,4-, 1,5- or 1,8-di-(2',4',5'-trimethylanilino)-anthraquinone, 1,4-, 1,5- or 1,8-di-(2'-ethylanilino)-anthraquinone, 1,4-, 1,5- or 1,8-di-(4'-tert.-butylanilino)-anthraquinone, 1,4-, 1,5- or 1,8-di-(2'-, 3'- or 4'-chloroanilino)-anthraquinone and 1,4-, 1,5- or 1,8-di-(2',3'-, 2',4'-, 2',5'-, 3',4'- or 3',5'-dichloroanilino)-anthraquinone, the mixtures of isomers of bis-dichloroanilino-anthraquinones which are formed in the reaction of 1,4-, 1,5- or 1,8-diaminoanthraquinone with 1,2,4-trichlorobenzene; and 1,4-, 1,5- or 1,8-di-(4'-methoxyanilino)-anthraquinone, 1,4-, 1,5- or 1,8-di-(4'-ethoxyanilino)-anthraquinone, 1,4-, 1,5- or 1,8-di-(4'-β-hydroxyethylanilino)-anthraquinone, 1,4-, 1,5- or 1,8-di-(2'-carboxyanilino)-anthraquinone, 1,4-, 1,5- or 1,8-di-(2'-carboxymethylanilino)-anthraquinone, 1,4-, 1,5- or 1,8-di-(2'-carboxyhydroxyethylanilino)-anthraquinone, 1-(4'-methylanilino)-4-, 5- or 8-(2',3'-, 2',4'-, 2',5'-, 2',6'-, 3',4'- or 3',5'-dimethylanilino)-anthraquinone, 1-(4'-methylanilino)- 4-, 5- or 8-(2',4',5'- or 2',4',6'-trimethylanilino)anthraquinone, 1-anilino-4-, 5- or 8-(4'-methylanilino)-anthraquinone, 1-(4'-nitroanilino)-4-(4'-methylanilino)-anthraquinone, 1,4-dianilino-5-hydroxyanthraquinone, 1,5-dianilino-4-hydroxyanthraquinone, 1,5-di-(4'-methylanilino)-4-hydroxyanthraquinone, 1,4-dianilino-5,8-dihydroxyanthraquinone, 1,5-dianilino-4,8-dihydroxyanthraquinone, 1,8-dianilino-4,5-dihydroxyanthraquinone, 1,4-di-(4'-methylanilino)-5,8-dihydroxyanthraquinone, 1,5-di-(4'-methylanilino)-4,8-dihydroxyanthraquinone, 1,8-di-(4'-methylanilino)-4,5-dihydroxyanthraquinone, 1,5-dianilino-4,8-diaminoanthraquinone, 1,5-di-(4'-methylanilino)-4,8-diaminoanthraquinone, 1,5-dianilino-4,8-dibenzoylaminoanthraquinone, 1,5-di-(4'-methylanilino)-4,8-dibenzoylaminoanthraquinone, 1,4-, 1,5- or 1,8-di-(4'-diphenylylamino)anthraquinone, 1,4-, 1,5- or 1,8-di-(4'-phenoxyanilino)-anthraquinone, 1,4-, 1,5- or 1,8-di-(4'-phenylaminoanilino)-anthraquinone, 1,4-, 1,5- or 1,8-di-(4'-benzoylanilino)-anthraquinone, 1,4-, 1,5- or 1,8-di-(4'-benzylanilino)-anthraquinone, 1,4-, 1,5- or 1,8-di-(4'-phenylsulphonylanilino)-anthraquinone, 1,4-di-(4'-benzylanilino)-5'-hydroxyanthraquinone, 1,5-di-(4'-phenoxyanilino)-4-hydroxyanthraquinone, 1,5-di-(4'-benzylanilino)-4,8-dihydroxyanthraquinone, 1,4-di-(4'-phenylaminoanilino)5,8-dihydroxyanthraquinone, 1,5-di-(4'-phenoxyanilino)-4,8-dihydroxyanthraquinone, 1,4-di-(4'-phenoxyanilino)-5,8-dihydroxyanthraquinone, 1,8-di-(4'-phenoxyanilino)-4,5-dihydroxyanthraquinone, 3,9-dianilinobenzanthrone, 3,9-di-(4'-methylanilino)benzanthrone, 3,9-di-(4'-phenoxyanilino)-benzanthrone, 3,9-di(4'-phenylaminoanilino)-benzanthrone, 3,9-di-(4'-benzylamino)benzanthrone, 1,5-dianilino-4,8-diphenylmercaptoanthraquinone, 1,4-, 1,5- or 1,8-diphenylmercaptoanthraquinone, 3,9-diphenylmercaptobenzanthrone, 1,4-di-(2'-carboxyphenylmercapto)-anthraquinone and 1,5- or 1,8-di-(2'-carboxyphenylmercapto)-anthraquinone.

Tri- and tetra-anilinoanthraquinone derivatives should also be mentioned, such as, for example: 1,4,5,8-tetranilinoanthraquinone, 1,4,5,8-tetra-(4'-methylanilino)-anthraquinone, 1,4,5,8-tetra-(4'-phenoxyanilino)-anthraquinone and 1,4,5-trianilino-8-hydroxyanthraquinone.

In the halogenation the halogen atoms enter both into the anilino or arylmercapto radical and into the anthraquinoidal part of the compounds to be halogenated, and new substances or mixtures of substances are formed which, compared with the nonhalogenated starting substances, are distinguished, especially in the bulk dyeing of polyester, by improved dyeing qualities such as a purer and more brilliant shade, higher depth of colour, increased solubility in the polymer, and better fastness to light, chlorite, dry cleaning or sublimation, but particularly better fastness to rubbing after thermofixing. It is possible to prepare various new colouring substances from the same starting material, depending on the degree of halogenation, that is to say to direct the halogenation in such a way that the particular improvement desired in the dyeing properties is achieved.

Halogenoanthraquinone compounds of particular interest for bulk dyeing linear polyesters are those of the formula IV

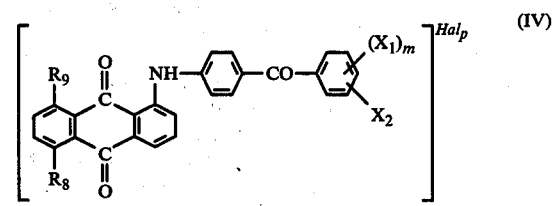

wherein $X_1$ denotes hydrogen or a methyl or ethyl group, $X_2$ denotes hydrogen or a propyl, butyl, methoxy, ethoxy, phenyl, naphthy, benzyl or phenoxy group, $R_8$ and $R_9$ denote hydrogen or methoxy, phenoxy or benzoylamino groups, Hal denotes chlorine or bromine, and m denotes the number 1-3 and p denotes the number 1 or 2.

Linear polyesters which may be mentioned are especially those which are obtained by polycondensation of terephthalic acid or esters thereof with glycols of the formula $HO-(CH_2)_n-OH$ wherein n denotes the number 2-10, or with 1,4-di(hydroxymethyl)-cyclohexane, or by polycondensation of glycol ethers of hydroxybenzoic acids, for example p-(β-hydroxyethoxy)-benzoic acid. The term linear polyesters also includes copolyesters which are obtained by partially replacing the terephthalic acid by another dicarboxylic acid and/or by partially replacing the glycol by another diol.

However, the polyethylene terephthalates are of particular interest.

The linear polyesters to be dyed, appropriately in the form of powders, chips or granules, are intimately mixed with the dyestuff. This can be carried out, for example, by dusting the polyester particles with the finely divided, dry dyestuff powder or by treating the polyester particles with a solution or dispersion of the dyestuff in an organic solvent and subsequently removing the solvent.

Finally, the substance to be used for dyeing can also be added direct to the fused polyester or can be added before or during the polycondensation of the polyethylene terephthalate.

The ratio of dyestuff to polyester can vary within a wide range, depending on the depth of colour desired. In general it is advisable to use 0.01-3 parts of dyestuff to 100 parts of polyester.

The polyester particles treated in this way are melted in the extruder by known processes and are extruded to give articles, especially films or fibres, or are cast to give sheets.

Uniformly and intensely dyed articles with a high fastness to light are obtained. The dyed fibres which can be obtained in accordance with the process are, in addition, distinguished by outstanding fastness to wet processing and dry cleaning.

A particular advantage of the dyestuffs to be used in accordance with the invention consists in the fact that they dissolve in the polyester melt and, surprisingly, withstand high temperatures, up to 300° C., without decomposition, so that significantly clearer dyeings are obtained than when insoluble pigments are used.

In the following examples, unless otherwise specified, the parts denote parts by weight and the percentages denote percentages by weight.

EXAMPLE 1

25.2 parts of 1,5-di-(4'-methylanilino)-anthraquinone are stirred in 300 parts of nitrobenzene and a solution of 21.2 parts of bromine in 100 parts of nitrobenzene is added dropwise over the course of 10–15 minutes. The resulting mixture is then stirred for 18–20 hours at room temperature and subsequently for a further 3 hours at 60° C. After cooling, the product is filtered off, washed first with a small amount of nitrobenzene and then thoroughly with alcohol, and dried in vacuo at 80° C. A red, crystalline product, which has a bromine content of 27.5 to 28.5% and colours polyesters in deep, brilliantly bluish-tinged red shades, is obtained in a good yield. The colourations are characterised by very good fastness to light, washing, dry cleaning, cross-dyeing and sublimation, but particularly by an excellent fastness to rubbing after the coloured material has been thermofixed at 210° C.

In contradistinction thereto, the non-brominated 1,5-di-(4-methylanilino)-anthraquinone colours in violet shades with poor fastness to rubbing properties after thermofixing.

EXAMPLE 2

14.8 parts of bromine are added to 9.2 parts of 1,5-di(4'-chloroanilino)-anthraquinone in 150 parts of nitrobenzene and further treatment is carried out in accordance with Example 1. A purple-coloured, crystalline product is obtained in good yield, which has a bromine content of 38 to 41% and colours polyester in bluish-red shades of a brilliantly deep colour with outstanding fastness to light and very good fastness properties in other respects, but particularly excellent fastness to rubbing after the dyed material has been thermofixed.

In contrast with this, the non-brominated 1,5-di-(4-chloroanilino)-anthraquinone dyes in claret shades having poor fastness to rubbing after thermofixing.

EXAMPLE 3

94 parts of bromine are added gradually at 20°–25° C., with stirring, to a suspension of 100 parts of 1,4-di-(4'-methylanilino)-anthraquinone in 1,400 parts of nitrobenzene and the mixture is then stirred for 16 hours at 20°–25° C. and for 1 hour at 60° C. After the reaction mixture has cooled and reaction product is filtered off and washed with a little nitrobenzene and then with methanol. Yield: 131 parts of a dark powder with a 30.2% content of bromine. The product colours polyethylene terephthalate in bulk in a bluish-green shade. The colouration exhibits very good fastness to sublimation at 210° C., in contrast to that produced by the starting material.

EXAMPLE 4

A solution of 7.2 parts of bromine in 60 parts of nitrobenzene is added, in the course of one hour and at 20°–25° C. and with stirring, to a suspension of 9.6 parts of 1-(4"-phenyl-4'-benzoyl)-anilinoanthraquinone in 240 parts of nitrobenzene. The reaction mixture, which gradually becomes more viscous, is stirred for 16 hours at 20°–25° C. and then 80 parts of ethanol are added. The reaction product which is precipitated is filtered off and washed with ethanol. 10.1 parts of the dyestuff having the formula

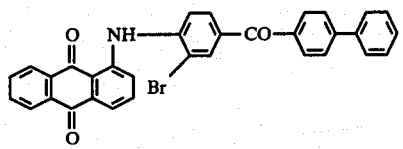

are obtained. It colours polyethylene terephthalate in bulk in a bright orange-coloured shade of excellent fastness properties. The durability of the shade when subjected to dry heat (210° C., 30 seconds) is distinctly improved, compared with the starting material, which colours red.

EXAMPLE 5 (Dyeing example)

Undelustered polyethylene terephthalate granules, suitable for fibre manufacture, are shaken with 1% of one of the colourants described in the proceding examples, in a vessel capable of being closed, for 15 minutes on a shaking machine. The uniformly dyed granules are spun, on a melt-spinning apparatus (285° C. ± 3° C., dwellce time in the spinning machine approx. 5 minutes) into filaments which are stretched on a stretch-and-twist installlation and are wound up. The solubility of the colourants in polyethylene terephthalate results in brilliant colourations.

The coloured material can be treated and tested as follows:

(a) Thermofixing

A sample of the coloured material is treated for 30 seconds at 210° C. in a precision ironing press and is given further fixing treatment for 30 minutes at 135° C.

(b) Testing the fastness to rubbing after thermofixing

A dry, uncoloured cotton or polyethylene terephthalate fabric is moved to and fro across a 10 cm long sample of the coloured and thermofixed material 10 times in a Crockmeter at a pressure of 900 g, over the course of 10 seconds. The staining of the uncoloured material is assessed.

(c) Testing staining during thermofixing

A sample of the coloured material, together with an uncoloured comparison fabric (polyamide or polyester) is treated in a precision ironing press for 30 seconds at 210° C.

EXAMPLE 6

A suspension of 8.06 parts of 1-(4'-benzoylanilino)anthraquinone in 330 parts of nitrobenzene is treated with 3.2 parts of bromine at 20° C., with stirring. The resulting syspension is stirred for 17 hours at 25° C. and for 5 hours at 65°–70° C. After cooling the reaction mixture, the colourant is filtered off, washed with alcohol and dried; it has a bromine content of 16.4%. It colours polyethylene terephthalate in bulk in an orange-coloured shade of very good fastness properties, especially excellent behaviour with respect to staining an undyed fabric drung thermofixing at 210° C. The starting substance, which colours red, stains a comparison fabric strongly.

EXAMPLE 7

11 parts of 1,5-di-(4"-phenyl-4'-phenylsulphonylanilino)-anthraquinone are suspended in 180 parts of nitrobenzene at 20° C., with stirring, and are treated with 4.4 parts of bromine. The mixture is stirred for 18 hours at 25° C. and for 5 hours at 65° C. The resultant colourant is precipitated by pouring the reaction mixture into 800 parts of ethanol. It has a bromine content of 9.2% and colours polyethylene terephthalate in bulk in a claret shade of excellent fastness properties. The fastness to rubbing after thermofixing is distinctly improved compared with the starting material.

EXAMPLE 8

3.3 parts of bromine are added, with stirring, at 20° C. to a suspension of 9.2 parts of 1,5-di-(2'-chloroanilino)anthraquinone in 75 parts of nitrobenzene. The mixture is stirred for 15 minutes at 20°–25° C. and for 5 hours at 65° C. The resultant colourant is filtered off, after cooling the reaction mixture, and is washed with small amount of nitrobenzene and then with ethanol and dried. It has a bromine content of 15.3% and a chlorine content of 13% and colours polyethylene terephthalate, in bulk, in a bluish-red shade of very good fastness properties. The fastness to light is distinctly improved compared with the starting materials.

EXAMPLE 9

6.6 parts of bromine are added, with stirring, at 20° C. to a suspension of 9.2 parts of 1,5-di-(3'-chloroanilino)anthraquinone. The mixture is stirred for 22 hours at 25° C. and for 6 hours at 70° C. After adding 5 parts of sodium carbonate, the mixture is kept for ¼ hour at 70° C. The resultant colourant is filtered off, after cooling the suspesion to 20° C., and is washed with a small amount of nitrobenzene, and then with ethanol and hot water and dried. The colourant has a bromine content of 25.3% and a chlorine content of 11.3%; it colours polyethylene terephthalate in bulk in a bluish-red shade of very good fastness properties. Compared with the starting material, which colours in a claret shade, the colourant exhibits substantially better behaviour with respect to staining a comparison fabric during thermofixing at 210° C.

EXAMPLE 10

84.5 parts of 1,8-diphenylmercaptoanthraquinone are treated with 70.5 parts of bromine in accordance with the instructions of Example 1.

A crystalline, yellow product is obtained, which is shown by analysis to be the dibromo derivative:

| $C_{26}H_{14}O_2S_2Br_2$ | Calculated | S 11.01% | Br 27.44% |
|---|---|---|---|
| | Found | S 11.10% | Br 27.20% |

The resultant dye colours polyester material by the melt-spinning process in greenish-yellow, fast shades; compared with those of the non-brominated material, the colourations exhibit a reduced tendency to stain during thermofixing, particularly in respect to polyamide fabric.

A similar improvement of the fastness properties of 1,8-diphenylmercaptoanthraquinone is also obtained if chlorinated according to the following Example 13.

An analogous bromination of equivalent parts of the following phenylmercaptoanthraquinone derivatives yields the colourants listed in the following table, which display the cited advantages over the starting materials:

| Ex. | Starting material | Bromine content | Shade | Advantage over starting material |
|---|---|---|---|---|
| 11 | 1,4,5,8-tetraphenylmercapto-anthraquinone | 20–23% | Brilliant pink | brighter shade |
| 12 | 1-(4'-phenoxyanilino)-5-phenylmercapto-anthraquinone | 24–25% | Redbrown | better fastness to light |

EXAMPLE 13

84 parts of 1,5-di-(4'-methylanilino)-anthraquinone in 750 parts of nitrobenzene are stirred with 0.5 parts of iodine and a solution of 60 parts of sulphuryl chloride in 250 parts of nitrobenzene is added over the course of 30–60 minutes. Thereafter the mixture is stirred for 15 hours at room temperature and then for a further 3 hours at 60° C. The reaction mixture is then freed from nitrobenzene by steam distillation and the colorant mass which has separated out is filtered off after cooling, washed with water and then three times with a small amount of alcohol and dried in vacuo at 60° C. A violet mixture is obtained, which has a chlorine content of 14.5–15.5% and colours polyester in bulk in deep reddish violet shades.

Compared with the violet colourations of the starting material, those of the chlorinated dye have the advantage of better fastness to light and excellent fastness to rubbing after the dyed material has been thermofixed.

If the chlorination is carried out in accordance with the above example using twice the amount of sulphuryl chloride, a dye with a chlorine content of 26–28%, which colours in a claret shade is obtained, and which, compared with the starting material, is characterised by similar advantages in dyeing.

Corresponding violet dyes are also obtained if 1,5-di-(3'-methylanilino)-anthraquinone is chlorinated according to the above particulars instead of 1,5-di-(4'-methylanilino)-anthraquinone.

EXAMPLE 14

8.9 parts of 1,5-bis-(2',3'-dimethylanilino)-anthraquinone are chlorinated in 75 parts of nitrobenzene with the addition of 0.1 part of iodine, with a solution of 6 parts of sulphuryl chloride in 25 parts of nitrobenzene in accordance with the particulars of Example 13 and the reaction mixture is worked up. Yield: 10 parts of a violet dye with a chlorine content of 13.5 to 14.5% which colours polyester in violet shades. Compared with the violet colourations of the starting materials, those of the chlorinated dye have a substantially better behaviour in regard to the staining of comparison fabric during the thermofixing at 210° C. and also an improved fastness to rubbing after thermofixing.

The dyes listed in the following Table, which have the indicated advantages compared with the starting materials, are obtained by an analogous chlorination of equivalent parts of the following bis-(dimethylanilino)-anthraquinones:

| Ex. | Starting Material | Chlorine content | Shade | Advantage compared with starting material |
|---|---|---|---|---|
| 15 | 1,5-bis-(2',4'-dimethylanilino)-anthraquinone | 13.5–14.5% | violet | as Example 14 |
| 16 | 1,5-bis-(3',4'-dimethylanilino)-anthra- | 13.5–14.% | violet | as Example 14 |

EXAMPLE 20

23.7 Parts of the compound

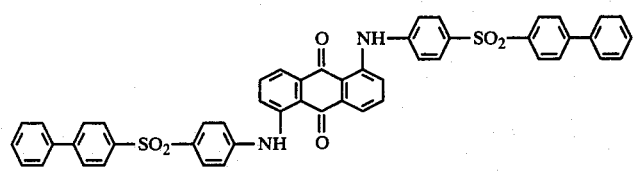

obtained by reaction of 1,5-diaminoanthraquinone with 4-chloro-4'-phenyldiphenylsulphone in nitrobenzene in the presence of sodium carbonate and copper (I) chloride at boiling temperature, are suspended in 180 parts of nitrobenzene, with stirring, and the suspension is treated with a solution of 9.6 parts of bromine in 12 parts of nitrobenzene. The mixture is stirred for 16 hours at 20°–25° C. and for 5 hours at 65° C. The resultant colourant is precipitated by addition of 360 parts of methanol, filtered off after cooling the suspension to 20° C., washed with methanol and dried. Yield: 24.8 parts of a colourant with a bromine content of 8.8%. It colours polyester in bulk in claret shades of very good fastness properties. Compared with a comparison sample obtained with the starting material, the coloured polyester material is characterised by a substantially improved fastness to rubbing after thermofixing.

What we claim is:

1. In the process of bulk dyeing linear polyesters with a pigment of the anthraquinone series, the improvement comprising using as a pigment, an arylmercapto anthraquinone obtained by halogenation, using chlorinating or brominating agents, of 1,8-diphenylmercapto anthraquinone.

2. A composition comprising a linear polyester bulk dyed with a halogenated pigment prepared by brominating a diphenylmercapto anthraquinone and said halogenated pigment having the formula

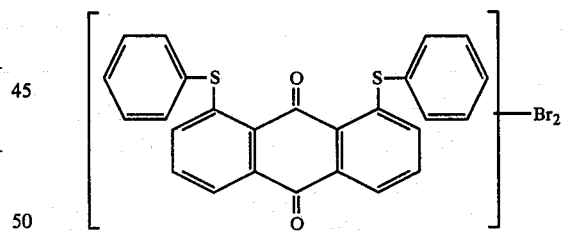

3. A process according to claim 1, wherein the halogenated pigment is the formula

* * * * *

---

-continued

| Ex. | Starting Material | Chlorine content | Shade | Advantage compared with starting material |
|---|---|---|---|---|
| | quinone | | | |

EXAMPLE 17

8.95 Parts of 1,5-bis-(2',4'-dimethylanilino)-anthraquinone are brominated in 75 parts of nitrobenzene with a solution of 7.1 parts of bromine in 25 parts of nitrobenzene in accordance with the particulars of Example 1 and the reaction mixture is worked up in analogous manner to Example 13 by steam distillation. Yield: 12 parts of a red dye with a bromine content of 27.5 to 28.5%, which colours polyester in bulk in fast, red shades.

Compared with the violet colourations of the starting material, those of the brominated dye have — in addition to the advantage of the useful shade — an improved light fastness, a substantially better behaviour in regard to the staining of comparison fabric during the thermofixing at 210° C., and also an improved fastness to rubbing after thermofixing.

The dyes listed in the following table, which have the indicated advantages compared with the starting materials, are obtained by an analogous bromination of equivalent parts of the following bis-(dimethylanilino)-anthraquinone:

| Ex. | Starting material | Bromine content | Shade | Advantage compared with starting material |
|---|---|---|---|---|
| 18 | 1,8-bis-(2',4'-dimethylanilino)-anthraquinone | 26.5–28.5% | red | improved light-fastness |
| 19 | 1,8-bis-(2',5'-dimethylanilino)-anthraquinone | 26.5–27.5% | violet | improved behaviour in regard to staining during thermofixing |